United States Patent
Chen et al.

(10) Patent No.: US 10,235,186 B2
(45) Date of Patent: Mar. 19, 2019

(54) METHOD AND ASSOCIATED APPARATUS FOR PERFORMING WAKE-UP MANAGEMENT ON NETWORK DEVICES

(71) Applicant: Synology Incorporated, Taipei (TW)

(72) Inventors: Kan-Yueh Chen, Taoyuan (TW); Ping-Che Hsiao, Taipei (TW); Jia-Yu Liu, New Taipei (TW)

(73) Assignee: SYNOLOGY INCORPORATED, Taipei, Taiwan (CN)

( * ) Notice: Subject to any disclaimer, the term of this patent is extended or adjusted under 35 U.S.C. 154(b) by 84 days.

(21) Appl. No.: 15/458,987

(22) Filed: Mar. 15, 2017

(65) Prior Publication Data

US 2018/0024843 A1  Jan. 25, 2018

(30) Foreign Application Priority Data

Jul. 20, 2016 (TW) .............................. 105122842 A

(51) Int. Cl.
*H04L 12/12* (2006.01)
*G06F 9/4401* (2018.01)
*H04L 12/26* (2006.01)
*H04W 52/02* (2009.01)
*H04W 84/12* (2009.01)

(52) U.S. Cl.
CPC .......... *G06F 9/4416* (2013.01); *G06F 9/4418* (2013.01); *H04L 12/12* (2013.01); *H04L 43/0805* (2013.01); *H04W 52/0216* (2013.01); *H04W 52/0229* (2013.01); *H04W 84/12* (2013.01)

(58) Field of Classification Search
CPC ..... G06F 9/4416; G06F 9/4418; H04L 12/12; H04L 32/0805
USPC .......................................................... 713/2
See application file for complete search history.

(56) References Cited

U.S. PATENT DOCUMENTS

| | | |
|---|---|---|
| 2008/0001734 A1 | 1/2008 | Stilp |
| 2011/0162018 A1 | 6/2011 | Dodd |
| 2014/0201425 A1* | 7/2014 | Clark ...................... G06F 3/061 711/103 |

(Continued)

FOREIGN PATENT DOCUMENTS

| | | |
|---|---|---|
| CN | 104780054 A | 7/2015 |
| TW | 201538010 A | 10/2015 |

*Primary Examiner* — Austin Hicks
(74) *Attorney, Agent, or Firm* — McClure, Qualey & Rodack, LLP

(57) ABSTRACT

A method for performing wake-up management and an associated apparatus are provided, where the method is applied to at least one portion of a network system, and the network system includes a local area network (LAN). The method includes: utilizing a wake-on-LAN (WOL) agent device to receive device information of a network device, where the WOL agent device and the network device are positioned in the LAN, and the network device broadcasts the device information according to a predetermined communications protocol; utilizing the WOL agent device to update a wake-up management list in the WOL agent device according to the device information, where the wake-up management list includes the device information; and utilizing the WOL agent device to perform a WOL operation on the network device according to the wake-up management list.

18 Claims, 9 Drawing Sheets

(56) References Cited

U.S. PATENT DOCUMENTS

2015/0026491 A1* 1/2015 Park .................. H04L 12/12
                                                    713/310
2015/0039917 A1* 2/2015 Morikawa .............. G06F 1/32
                                                    713/310
2015/0282072 A1   10/2015 Glik

* cited by examiner

METHOD AND ASSOCIATED APPARATUS FOR PERFORMING WAKE-UP MANAGEMENT ON NETWORK DEVICES

BACKGROUND OF THE INVENTION

1. Field of the Invention

The present invention relates to automation management of reference information for remotely waking up one or more network devices, and more particularly, to a method and associated apparatus for performing wake-up management.

2. Description of the Related Art

When performing wake-on-LAN (WOL) operations, a WOL agent in a related art local area network (LAN) requires manual settings by a user (e.g. the administrator of the LAN). Some problems may be encountered in the related art schemes. For example, in order for the WOL agent to have sufficient information for performing WOL operations upon any of a plurality of network devices in the LAN, the user must set reference information for each of the network devices, which wastes a lot of time. The amount of time wasted is increased when the network devices are many, resulting in an unsatisfying user experience. Hence, there is a need for a novel method and associated architecture which can perform WOL operations without introducing unwanted side effects.

SUMMARY OF THE INVENTION

An objective of the present invention is to provide a method and associated apparatus for performing wake-up management, in order to solve the aforementioned problem.

Another objective of the present invention is to provide a method and associated apparatus for performing wake-up management, in order to raise the overall efficiency of a network system.

At least one embodiment of the present invention provides a method for performing wake-up management, wherein the method is applied to at least one portion (e.g. part or all) of a network system, wherein the network system comprises a local area network (LAN). The method comprises: utilizing a wake-on-LAN (WOL) agent device to receive device information of a network device, wherein the WOL agent device and the network device are positioned in the LAN, and the network device broadcasts the device information according to a predetermined communications protocol; utilizing the WOL agent device to refer to the device information of the network device to update a wake-up management list in the WOL agent device, wherein the wake-up management list comprises the device information of the network device; and utilizing the WOL agent device to perform a WOL operation regarding the network device according to the wake-up management list.

In addition to the above method, the present invention also provides an apparatus for performing wake-up management, wherein the apparatus may comprise at least one portion of a network system, and the network system may comprise a LAN. The apparatus comprises a wake-on-LAN (WOL) agent device which is positioned in the LAN. The WOL agent device is arranged to perform wake-up control, wherein the WOL agent device receives device information of a network device. The network device is positioned in the LAN, and the network device refers to a predetermined communications protocol to broadcast the device information of the network device. The WOL agent device refers to the device information of the network device to update a wake-up management list in the WOL agent device, wherein the wake-up management list comprises the device information of the network device. The WOL agent device refers to the wake-up management list to perform a WOL operation regarding the network device.

In some embodiments, any of the network devices in the LAN may utilize the aforementioned predetermined communications protocol (e.g. one of existing protocols) to communicate with the WOL agent device by broadcasting. For example, when a specific network device within the network devices enters a non-operating state, such as a sleep state or a power off state, the WOL agent device may connect (or link) to a keeper device and establish a network connection with the keeper device, in order to inform the keeper device of the non-operating state of the network device via the network connection. In another example, the WOL agent device and the keeper device may establish a network connection in advance, wherein when a specific network device of the network devices enters a non-operating state, such as a sleep state or a power off state, the WOL agent device may inform the keeper device of the non-operating state of the network device via the network connection. Further, a client device may communicate with the WOL agent device or one of the network devices through the keeper device. In some embodiments, the keeper device may manage a plurality of LANs. For example, a plurality of WOL agent devices and a plurality of network devices may be positioned in at least one LAN of the LANs, wherein one of the WOL agent devices may be a backup device of another of the WOL agent devices.

The method and associated apparatus of the present invention may properly solve related art problems without introducing unwanted side effects. Further, the method and associated apparatus of the present invention may raise the overall efficiency of the system. Moreover, the method and associated apparatus of the present invention are compatible with fault-tolerant architectures, and thus the wake-up management architecture based on the method and apparatus of the present invention may raise the user experience.

These and other objectives of the present invention will no doubt become obvious to those of ordinary skill in the art after reading the following detailed description of the embodiment that is illustrated in the various figures and drawings.

DETAILED DESCRIPTION

The embodiments of the present invention provide methods and associated apparatus for performing automatic wake-up management of a network device in at least one local area network (LAN), and automatically operating at least one wake-on-LAN (WOL) agent device. According to a method and associated apparatus of the present invention, the wake-up management architecture may perform broadcasting via a predetermined communications protocol, such as one of existing communications protocols. Hence, in the WOL agent device, the WOL configurations (e.g. basic LAN information of the network devices), and the states of the network devices may be dynamically set without the need for manual settings. Further, a keeper device may be positioned in the wake-up management architecture. By utilizing the keeper device, the user may easily manage any of a plurality of LANs. In addition, the wake-up management architecture may be applied to the Internet of Things (IoT), sensor networks, etc.

Figure 1:
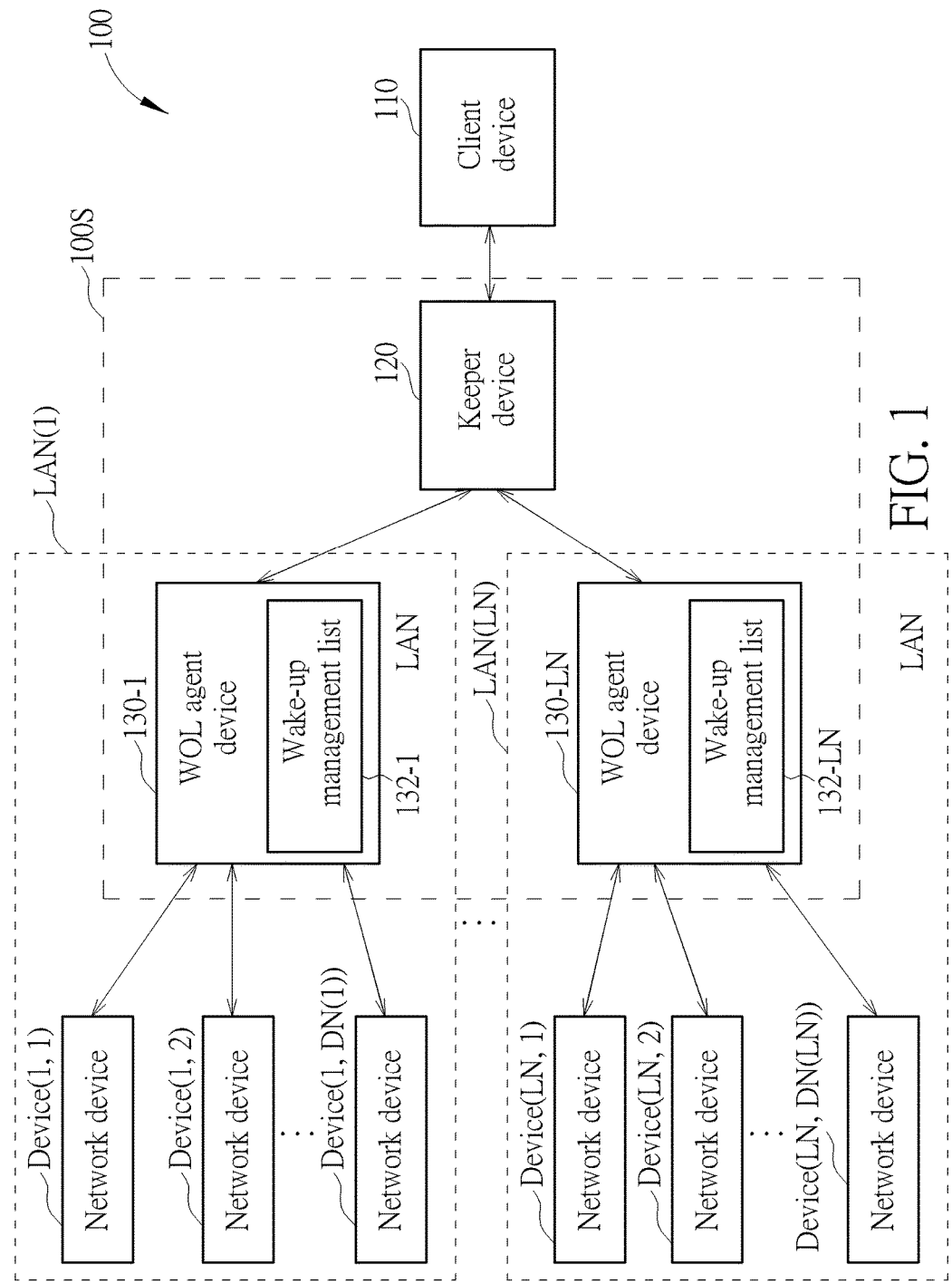
FIG. 1 is a diagram illustrating a network system according to an embodiment of the present invention.

FIG. 1 is a diagram illustrating a network system 100 according to an embodiment of the present invention. The network system 100 may include a client device 110, a keeper device 120, and LN LANs {LAN(1), ..., LAN(LN) }, in which the symbol LN may represent a positive integer, and a wake-on-LAN (WOL) architecture may be positioned in each of the aforementioned LN LANs {LAN(1), ..., LAN(LN)}. Examples of the client device 110 may include (but are not limited to): a multifunctional mobile phone, tablet, wearable device, and personal computer (e.g. a laptop PC or a desktop PC). In this embodiment, the network system 100 may include LN WOL agent devices {130-1, ..., 130-LN} and LN sets of network devices {{Device(1, 1), Device(1, 2), ..., Device(1, DN(1))}, ..., {Device(LN, 1), Device(LN, 2), ..., Device(LN, DN(LN))}}, and the LN WOL agent devices {130-1, ..., 130-LN} and the LN sets of network devices {{Device(1, 1), Device(1, 2), ..., Device(1, DN(1))}, ..., {Device(LN, 1), Device(LN, 2), ..., Device(LN, DN(LN))}} are placed in the LN LANs {LAN (1), ..., LAN(LN)}, in which the symbols "DN(1)", ..., "DN(LN)" represent positive integers. Examples of the WOL agent devices {130-1, ..., 130-LN} may include (but are not limited to): routers, network attached storage (NAS) servers, personal computers, and electronic devices equipped with WOL functions. Examples of the network devices {{Device(1, 1), Device(1, 2), ..., Device(1, DN(1))}, ..., {Device(LN, 1), Device(LN, 2), ..., Device(LN, DN(LN))}} may include (but are not limited to): personal computers, and NAS servers. As shown in FIG. 1, the WOL agent devices {130-1, ..., 130-LN} may generate and store the wake-up management lists {132-1, ..., 132-LN}, respectively. Further, the WOL agent devices {130-1, ..., 130-LN} may dynamically update the wake-up management lists {132-1, ..., 132-LN}, and may refer to the wake-up management lists {132-1, ..., 132-LN} to respectively perform wake-up management upon the LN sets of network devices {{Device(1, 1), Device(1, 2), ..., Device(1, DN(1))}, ..., {Device(LN, 1), Device(LN, 2), ..., Device(LN, DN(LN))}}.

In this embodiment, the apparatus for performing wake-up management may include at least one portion (e.g. part or all) of the network system 100, such as a wake-up management system 100S in the network system 100, or any portion of the wake-up management system 100S (e.g. the keeper device 120 or any of the WOL agent devices {130-1, ..., 130-LN}). As shown in FIG. 1, the wake-up management system 100S may include the keeper device 120 and the WOL agent devices {130-1, ..., 130-LN}, and may comprise LN communications channels between the keeper device 120 and the WOL agent devices {130-1, ..., 130-LN}. Further, the aforementioned WOL architecture may be extended external to the LAN via the LN communications channels, and more particularly, external to the keeper device 120. The client device 110 may access a target network device through the keeper device 120, such as any network device within the aforementioned LN sets of network devices {{Device(1, 1), Device(1, 2), ..., Device(1, DN(1))} ..., {Device(LN, 1), Device(LN, 2), ..., Device(LN, DN(LN))}}, in which when the target network device is in the non-operating state, the keeper device 120 may trigger the WOL architecture to perform a WOL operation.

Regarding the WOL operations of the aforementioned WOL architecture, when the target network device has entered the non-operating state (e.g. a sleep state or a power off state), the WOL agent device in the same LAN may send a predetermined package, such as a WOL package. More particularly, the WOL agent device may broadcast the predetermined package, to make the target network device enter the operating state from the non-operating state, in which the predetermined package may carry the media access control (MAC) address (e.g. the physical address) of the target network device. Under the situation where the target network device is in the sleep state, when the target network device receives the predetermined package, the target network can be woken up. In another example, under the situation where the target network device is in the power off state, when the target network device receives the predetermined package, the target network device may automatically power on in order to enter the power on state from the power off state.

The aforementioned WOL operation is based on the WOL configurations of the WOL agent device. In this embodiment, each of the WOL agent devices {130-1, ..., 130-LN} may automatically perform WOL configurations without the need for manual settings by the user (e.g. the administrator of the wake-up management system 100S). For example, one or more network devices in the network system 100 may be dynamically removed, and the WOL agent device in the LAN to which the one or more network devices belong may automatically perform. WOL configurations, and report the latest state to the keeper device 120. In another example, one or more network devices may be dynamically added to the network system 100, and the WOL agent device in the LAN to which the one or more network devices belong may automatically perform WOL configurations, and report the latest state to the keeper device 120. In another example, one or more WOL agent devices may be dynamically added to the network system 100, and a WOL agent device that operates in the LAN to which the newly added one or more WOL agent devices belong may automatically perform WOL configurations, and report the latest state to the keeper device 120. Hence, the wake-up management architecture based on the method and associated apparatus of the present invention may solve the related art problems.

Regarding the automatic WOL configurations of any WOL agent device 130-ln within the WOL agent devices {130-1, ..., 130-LN}, the WOL agent device 130-ln may receive the device information of any network device within the ln-th set of network devices {Device(ln, 1), Device(ln, 2), . . . , Device(ln, DN(ln))}, in which the symbol "ln" is a positive integer between [1, LN]. More particularly, the WOL agent device 130-ln may utilize the predetermined communications protocol to receive the device information of the network device, in which the network device may refer to the predetermined communications protocol to broadcast the device information of the network device. For example, when the state of the network device changes, the network device may refer to the predetermined communications protocol to broadcast the device information of the network device, allowing the WOL agent device 130-ln to automatically obtain and record the device information of the network device. In this embodiment, the WOL agent device 130-ln may refer to the device information of the network device to update the wake-up management list 132-ln, in which the wake-up management list 132-ln may include the device information of the network device. Hence, the WOL agent device 130-ln may refer to the wake-up management list 132-ln to perform WOL operations regarding the network device. For example, the network device may refer to the predetermined communications protocol to perform at least one broadcast operation, allowing the WOL agent device 130-ln to determine state transitions of the network device. In response to the broadcast operation, the WOL agent device 130-ln may determine the state transitions of the network device to automatically perform WOL configurations regarding the network device.

The aforementioned automatic WOL configuration is not limited to be applied to a single network device. Based on the architecture of the present invention, the automatic WOL configuration is applicable to multiple network devices. For example, the WOL agent device 130-ln may receive device information of another network device within the ln-th set of network devices {Device(ln, 1), Device(ln, 2), . . . , Device (ln, DN(ln))}, and more particularly, may utilize the predetermined communications protocol to receive the device information of the other network device, in which the other network device may refer to the predetermined communications protocol for broadcasting the device information of the other network device. For example, when the state of the other network device changes, the other network device may refer to the predetermined communications protocol to broadcast the device information of the other network device, allowing the WOL agent device 130-ln to automatically obtain and record the device information of the other network device. In this embodiment, the WOL agent device 130-ln may refer to the device information of the other network device to update the wake-up management list 132-ln in which the wake-up management list 132-ln may include the device information of the other network device. Hence, the WOL agent device 130-ln may refer to the wake-up management list 132-ln to perform a WOL operation upon the other network device.

Figure 2:
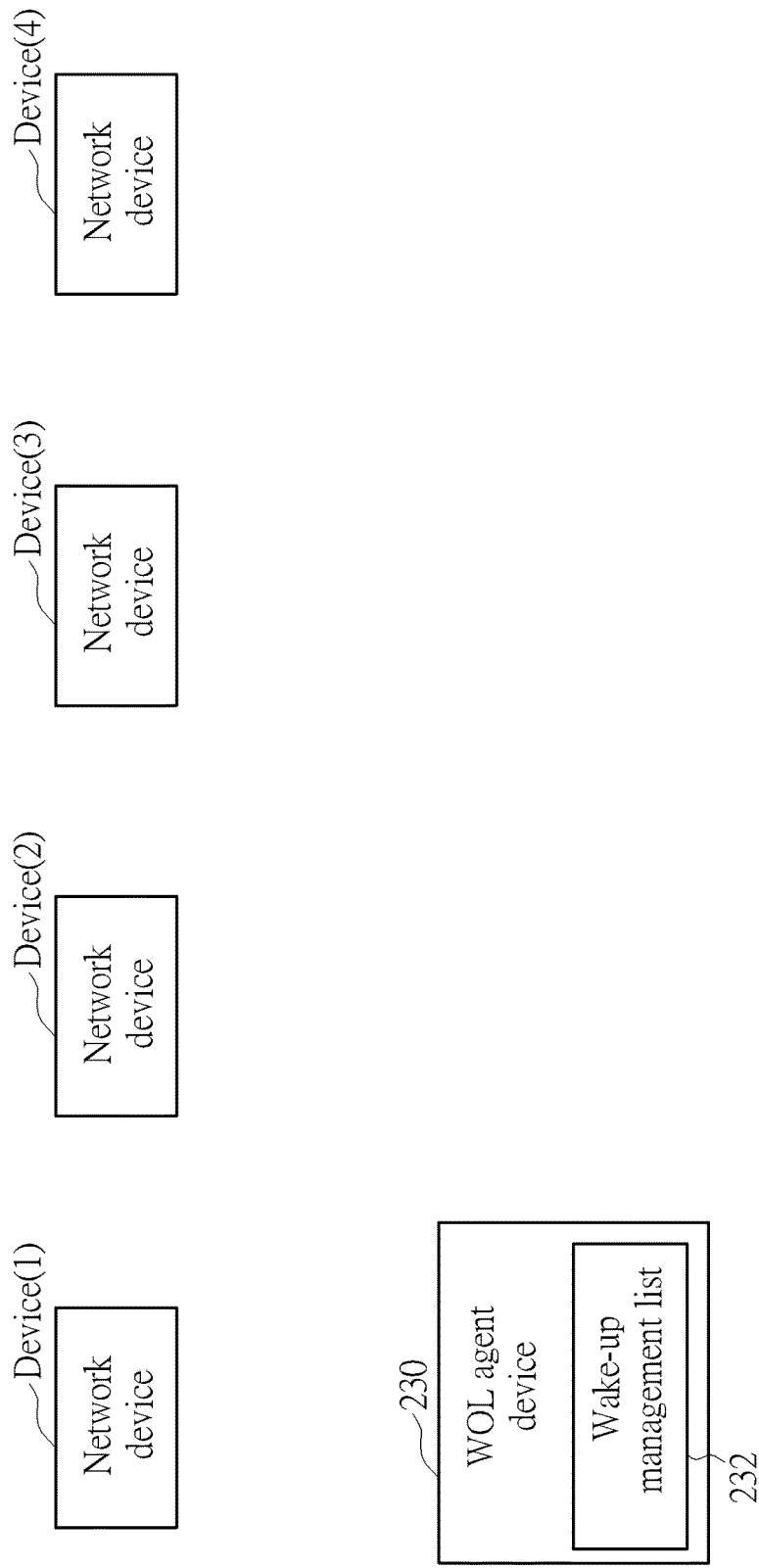
FIG. 2 is a diagram illustrating a wake-up management architecture of the network system shown in FIG. 1 according to an embodiment of the present invention.

FIG. 2 is a diagram illustrating a wake-up management architecture of the network system shown in FIG. 1 according to an embodiment of the present invention. For better understanding, the network devices {Device(1), Device(2), Device(3), Device(4)} are illustrated as an example of the ln-th set of network devices {Device(ln, 1), Device(ln, 2), . . . , Device(ln, DN(ln))}, the WOL agent device 230 is an example of the WOL agent device 130-ln and the wake-up management list 232 is an example of the wake-up management list 132-ln. In this situation, DN(ln)=4; however, this is merely for illustrative purposes, and is not a limitation of the present invention. In some embodiments, the number of network devices in the ln-th set of network devices {Device(ln, 1), Device(ln, 2), . . . , Device(ln, DN(ln))} can be changed.

In this embodiment, the WOL agent device 230 may receive the device information of each of the network devices {Device(1), Device(2), Device(3), Device(4)}, and more particularly, may utilize the predetermined communications protocol to receive device information of the network devices {Device(1), Device(2), Device(3), Device(4)}, in which the network devices {Device(1), Device(2), Device (3), Device(4)} may refer to the predetermined communications protocol to broadcast the device information of the network device. For example, when the state of a specific network device within the network devices {Device(1), Device(2), Device(3), Device(4)} changes, the network device may refer to the predetermined communications protocol to broadcast the device information of the network device, to allow the WOL agent device 230 to automatically obtain and record the device information of the network device, in order to update the wake-up management list 232, in which the wake-up management list 132-ln may include the device information and the latest state of the network device.

Figure 3:
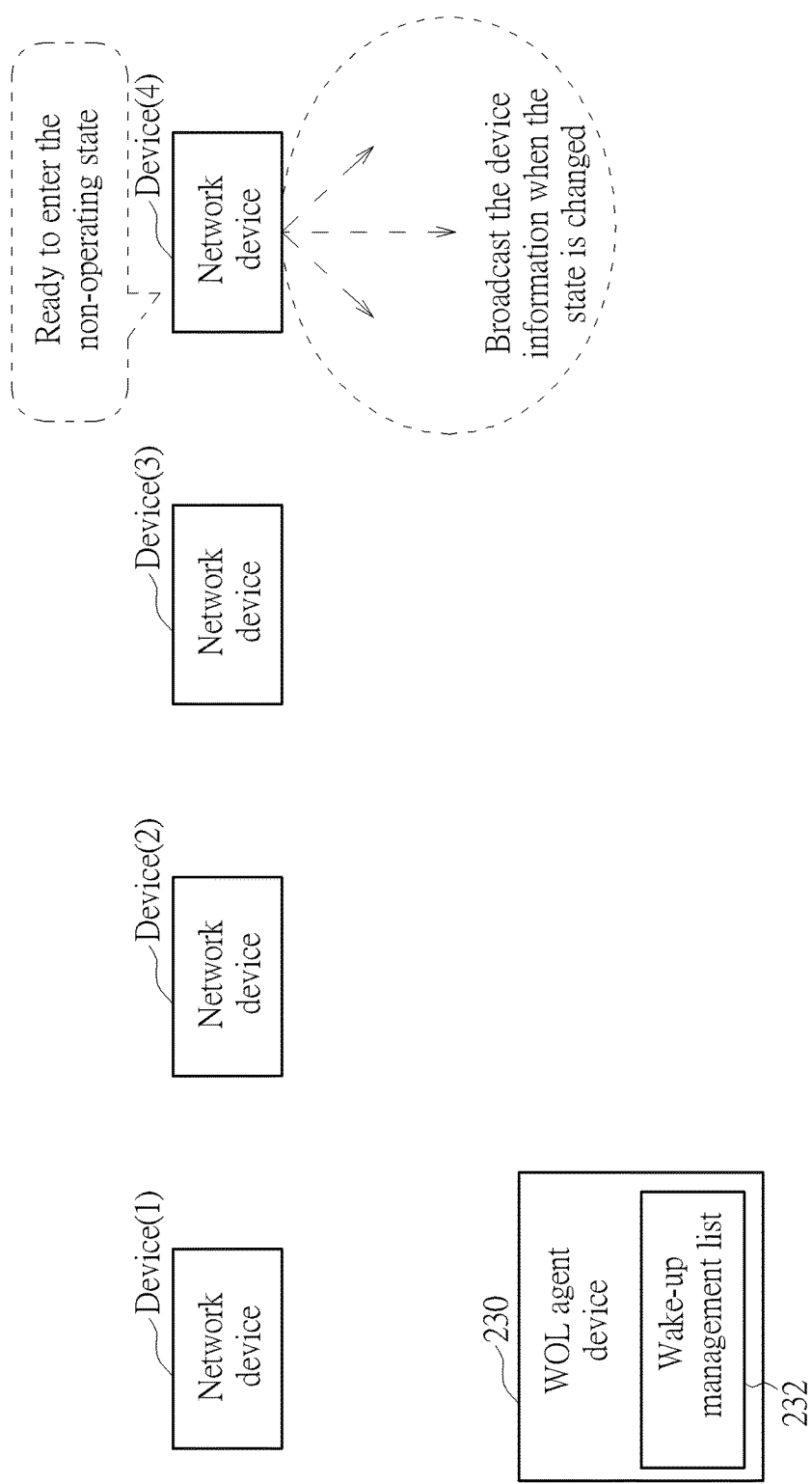
FIG. 3 is a diagram illustrating a broadcast operation in the wake-up management architecture shown in FIG. 2.

FIG. 3 is a diagram illustrating a broadcast operation in the wake-up management architecture shown in FIG. 2. For better understanding, the network device Device(4) may be an example of the aforementioned specific network device; however, this is merely for illustrative purposes, and not a limitation of the present invention. Note that any other network device within the network devices {Device(1), Device(2), Device(3), Device(4)} may an example of the aforementioned specific network device.

In this embodiment, when the network device Device(4) refers to the predetermined communications protocol to broadcast the device information of the network device Device(4), the device information broadcasted by the network device Device(4) may comprise at least one of the MAC address of the network device Device(4), an Internet protocol (IP) address of the network device Device(4), and an unique identifier (UID) of the network device Device(4). Hence, the WOL agent device 230 may record at least one of the MAC address of the network device Device(4), the IP address of the network device Device(4), and the UID of the network device Device(4) in the wake-up management list 232, and may record the latest state (the sleep/awake state, such as power on/off state) of the network device Device(4) in the wake-up management list 232, in order to update the wake-up management list 232.

When the network device Device(4) is added to the LAN LAN(ln) for the first time, the network device Device(4) is in the operating state. Hence, the WOL agent device 230 may record at least one of the MAC address of the network device Device(4), the IP address of the network device Device(4), and the unique identifier (UID) of the network device Device(4) in the wake-up management list 232, and may record the operating state of the network device Device (4) in the wake-up management list 232. After that, when the WOL agent device 230 receives the device information broadcasted by the network device Device(4), the WOL agent device 230 may determine that the network device Device(4) is switching between the operating state and the non-operating state. Since the network device Device(4) may toggle between the operating state and the non-operating state, when the information broadcasted by the network device Device(4) is received, the WOL agent device 230 may refer to a previous state of the network device Device(4) to determine that the latest state of the network device Device(4) is in contrast with the previous state. For example, since the previous state is the contrary state of the latest state, if the previous state of the network device Device(4) is the operating state, the latest state of the network device Device(4) will be the non-operating state, and vice versa.

Before the network device Device(4) enters the non-operating state, the network device Device(4) may refer to the predetermined communications protocol to broadcast the device information of the network device Device(4) in order to inform the WOL agent device 230 of the non-operating state of the network device Device(4). Further, after being informed of the non-operating state of the network device Device(4), the WOL agent device 230 may record the non-operating state of the network device Device(4) in the wake-up management list 232. In another example, when the network device Device(4) enters the operating state from the non-operating state, the network device Device(4) may refer to the predetermined communications protocol to broadcast the device information of the network device Device(4) in order to inform the WOL agent device 230 of the operating state of the network device Device(4). Further, after learning the operating state of the network device Device(4), the WOL agent device 230 may record the operating state of the network device Device(4) in the wake-up management list 232.

In some embodiments, it is not a necessary step that the WOL agent device 230 refers to the previous state of the network device Device(4) to determine the latest state of the network device Device(4). For example, when the network device Device(4) refers to the predetermined communications protocol to broadcast the device information of the network device Device(4), the device information broadcasted by the network device Device(4) may comprise at least one of the MAC address of the network device Device(4), the IP address of the network device Device(4), and the unique identifier (UID) of the network device Device(4), and may further comprise the latest state of the network device Device(4) (the sleep/awake state or power on/off state). Hence, the WOL agent device 230 may record at least one of the MAC address of the network device Device(4), the IP address of the network device Device(4), and the unique identifier (UID) of the network device Device(4) in the wake-up management list 232, and may record the operating state of the network device Device(4) in the wake-up management list 232.

Note that no matter whether the device information broadcasted by the network device Device(4) comprises the latest state of the network device Device(4) or not, since the wake-up management list 232 stores the latest state of the network device Device(4) (e.g. the sleep/awake state, such as power off/on state), the WOL agent device 230 may refer to the wake-up management list 232 to selectively perform a WOL operation regarding the network device Device(4) (e.g. the aforementioned WOL operation). In some embodiments, under the situation where the wake-up management list 232 indicates that the network device Device(4) is in the non-operating state, the WOL agent device 230 may perform WOL operation regarding the network device Device(4) (e.g. the client device 110 accesses the network device Device(4) through the keeper device 120) when there is a need; otherwise, the WOL agent device 230 does not perform the WOL operation regarding the network device Device(4).

In some embodiments, the way of implementing the wake-up control may be modified. For example, under the situation where the wake-up management list 232 indicates that the network device Device(4) is in the operating state, when triggering is performed (e.g. the client device 110 accesses the network device Device(4) through the keeper device 120), the WOL agent device 230 may perform a WOL operation regarding the network device Device(4), such as the aforementioned WOL operation, even if the network device Device(4) is already in the operating state. In these embodiments, although the network device Device(4) is already in the operating state, the WOL operation will not interfere with the operations of the network device Device(4).

In some embodiments, assuming that the network device Device(4) shown in FIG. 3 is the target network device, and the target network device is in the ln-th LAN LAN(ln), during the aforementioned automation WOL configuration, the WOL agent device 130-ln may utilize the predetermined communications protocol to receive the device information of the network device Device(4), and may send the device information of the network device Device(4) to the keeper device 120. The device information sent from the WOL agent device 130-ln to the keeper device 120 may include at least one state of the network device Device(4), such as the latest state thereof. Further, the client device 110 may send a request to the keeper device 120, in order to access the target network device through the keeper device 120. When the keeper device 120 receives the request from the client device 110, the keeper device 120 may refer to the state of the network device Device(4) to decide whether to assign a WOL task to the WOL agent device 130-ln wherein the WOL task comprises waking-up the network device Device(4). For example, when the latest state of the network device Device(4) is non-operating, the keeper device 120 may assign the WOL task to the WOL agent device 130-ln in order to wake-up the network device Device(4); otherwise, the keeper device 120 does not assign the WOL task to the WOL agent device 130-ln.

Analogous controls may be applied to any other LAN in the network system 100, and may be applied to another WOL agent device (which is configured in the other LAN), in order to perform wake-up management of another target network device (e.g. any network device in the other LAN). During the aforementioned automation WOL configuration, the other WOL agent device may utilize the predetermined communications protocol to receive the device information of the other target network device, and may send device information of the other target network device to the keeper device 120, wherein the device information (e.g. the device information of the other target network device) sent from the other WOL agent device to the keeper device 120 may comprise at least one state of the other target network device, such as the latest state thereof. The client device 110 may send another request to the keeper device 120 in order to access the other target network device through the keeper device 120. When the keeper device 120 receives the other request of the client device 110, the keeper device 120 may refer to the state of the other target network device to decide whether to assign another WOL task to the other WOL agent device, wherein the other WOL task comprises waking-up the other target network device. For example, when the latest state of the other target network device is non-operating, the keeper device 120 may assign the other WOL task to the other WOL agent device, in order to wake-up the other target network device; otherwise, the keeper device 120 does not assign the other WOL task to the other WOL agent device.

Figure 4:
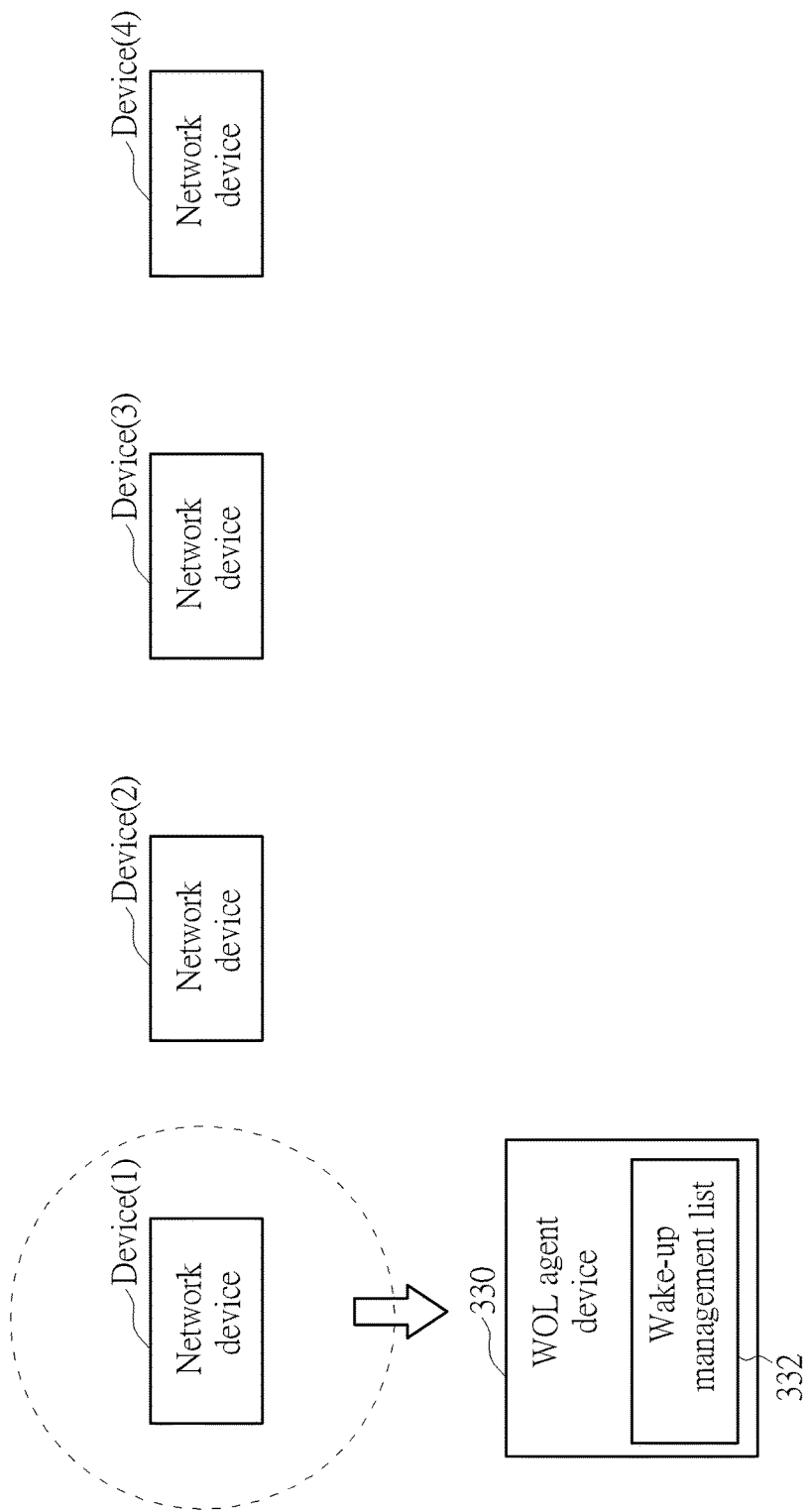
FIG. 4 is a diagram illustrating a network system according to another embodiment of the present invention.

FIG. 4 is a diagram illustrating a network system according to another embodiment of the present invention. Compared with the WOL agent device 230 shown in FIG. 2, the WOL agent device 330 in this embodiment is a network device selected from various network devices in the LAN LAN(ln), such as the network device Device(1). The wake-up management list 232 in this embodiment is replaced by the wake-up management list 332. For better understanding, in the embodiment of FIG. 4, the network device Device(1) is selected as the WOL agent device 330; however, this is merely for illustrative purposes, and not a limitation of the present invention. Any network device within the network devices {Device(1), Device(2), Device(3), Device(4)} other than the network device Device(1) may also be selected as the network device.

Figure 5:
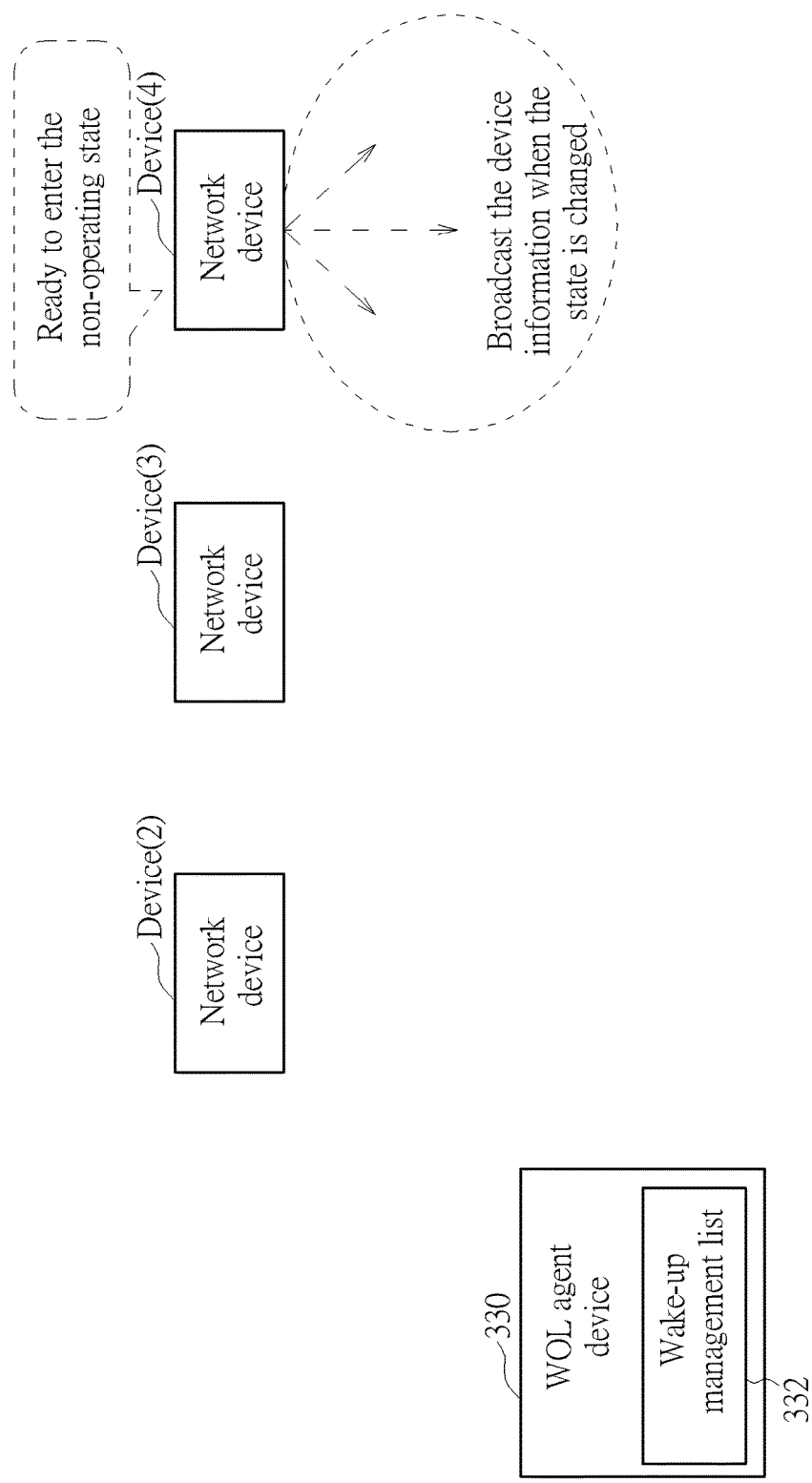
FIG. 5 is a diagram illustrating a broadcast operation in the wake-up management architecture shown in FIG. 4.

FIG. 5 is a diagram illustrating a broadcast operation in the wake-up management architecture shown in FIG. 4. In this embodiment, the WOL agent device 330 may perform the aforementioned operations of the WOL agent device 230. Some features in this embodiment similar to those in the above embodiments/modifications are omitted here for brevity.

Figure 6:
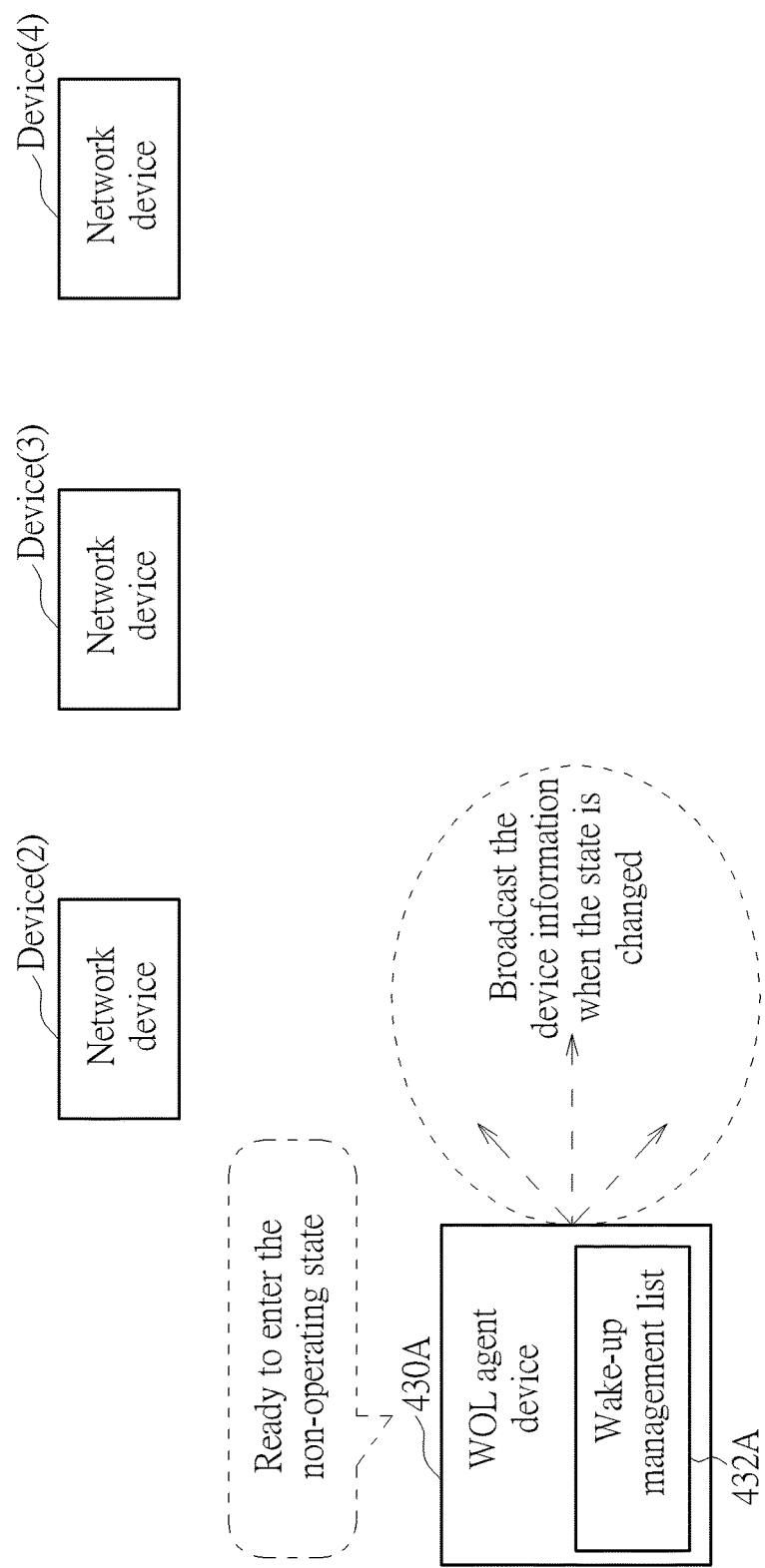
FIG. 6 is a diagram illustrating a wake-up management architecture of the network system shown in FIG. 1 according to another embodiment of the present invention.

FIG. 6 is a diagram illustrating a wake-up management architecture of the network system shown in FIG. 1 according to another embodiment of the present invention. In this embodiment, a specific network device within the network devices {Device(1), Device(2), Device(3), Device(4)} may be selected as an initial WOL agent device according to a predetermined rule, such as a default WOL agent device. Further, except for the initial WOL agent device, any network device within the network devices {Device(1), Device(2), Device(3), Device(4)} other than the selected initial network device may be selected as a backup device of the initial network device. If the WOL agent device 430A and the wake-up management list 432A thereof are equivalent to the WOL agent device 330 and the wake-up management list 332 thereof shown in FIG. 4, it means that the network device Device(1) plays the role of the WOL agent device 430A.

In this embodiment, before the WOL agent device 430A enters the non-operating state, the WOL agent device 430A may refer to the predetermined communications protocol to broadcast device information of the WOL agent device 430A in order to inform other network devices in the ln-th LAN LAN(ln) of the non-operating state of the WOL agent device 430A. Further, the non-operating state of the WOL agent device 430A will trigger the backup architecture of the LAN LAN(ln). When the non-operating state of the WOL agent device 430A is obtained, the WOL agent device 430A may be replaced by at least one of the other network devices.

When the WOL agent device 430A is replaced by the network device Device(1), any other network device within the network devices {Device(1), Device(2), Device(3), Device(4)}, such as the network devices Device(2), Device (3) or Device(4), may be selected as the backup device of the initial WOL agent device according to the predetermined rule. For example, the predetermined rule may represent a predetermined order of the network devices {Device(1), Device(2), Device(3), Device(4)}, such as the order of the indexes 1-4 corresponding to the network devices Device (1), Device(2), Device(3) and Device(4), respectively. This is merely for illustrative purposes, and not a limitation of the present invention. In some embodiments, the predetermined rule may represent one predetermined order of the network device in a predetermined subset of the network devices {Device(1), Device(2), Device(3), Device(4)} (e.g. the subset comprising the network devices Device(1) and Device (2)).

Figure 7:
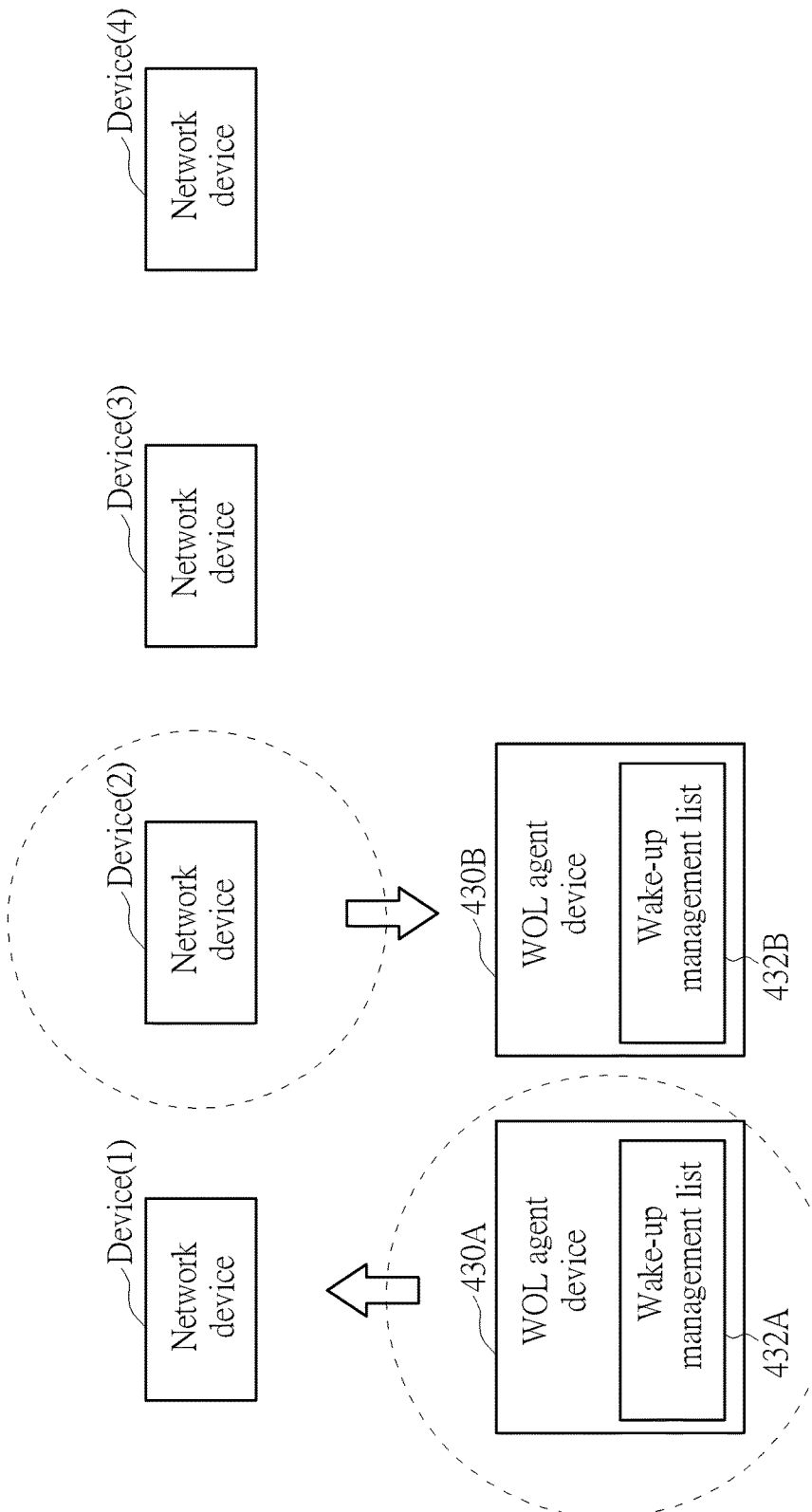
FIG. 7 is a diagram illustrating a switching operation in the wake-up management architecture shown in FIG. 6.

FIG. 7 is a diagram illustrating a switching operation in the wake-up management architecture shown in FIG. 6. For example, the network device Device(1), which previously played the role of the WOL agent device 430A, stops playing the role of the WOL agent device 430B. Hence, the latest WOL agent device in the LAN LAN(ln) becomes the WOL agent device 430B.

Compared with the WOL agent device 230 shown in FIG. 2, the WOL agent device 430B in this embodiment is a network device selected from various network devices in the LAN LAN(ln), such as the network device Device(2). In response to the change in architecture, the aforementioned wake-up management list 232 is replaced by the wake-up management list 432B in this embodiment. For better understanding, the network device Device(2) may be an example of the selected network device. Note that any network device within the network devices {Device(1), Device(2), Device (3), Device(4)} except for the network device that is going to enter the non-operating state (e.g. the network device Device(1)) may be an example of the selected network device (i.e. the selected WOL agent device).

According to some embodiments, the WOL agent device 430A may send the wake-up management list 432A to the WOL agent device 430B, to allow the WOL agent device 430B to use the wake-up management list 432A. For example, the WOL agent device 430B may use the wake-up management list 432A as an initial version of the wake-up management list 432B. Some features in this embodiment similar to those in the above embodiments/modifications are omitted here for brevity.

Figure 8:
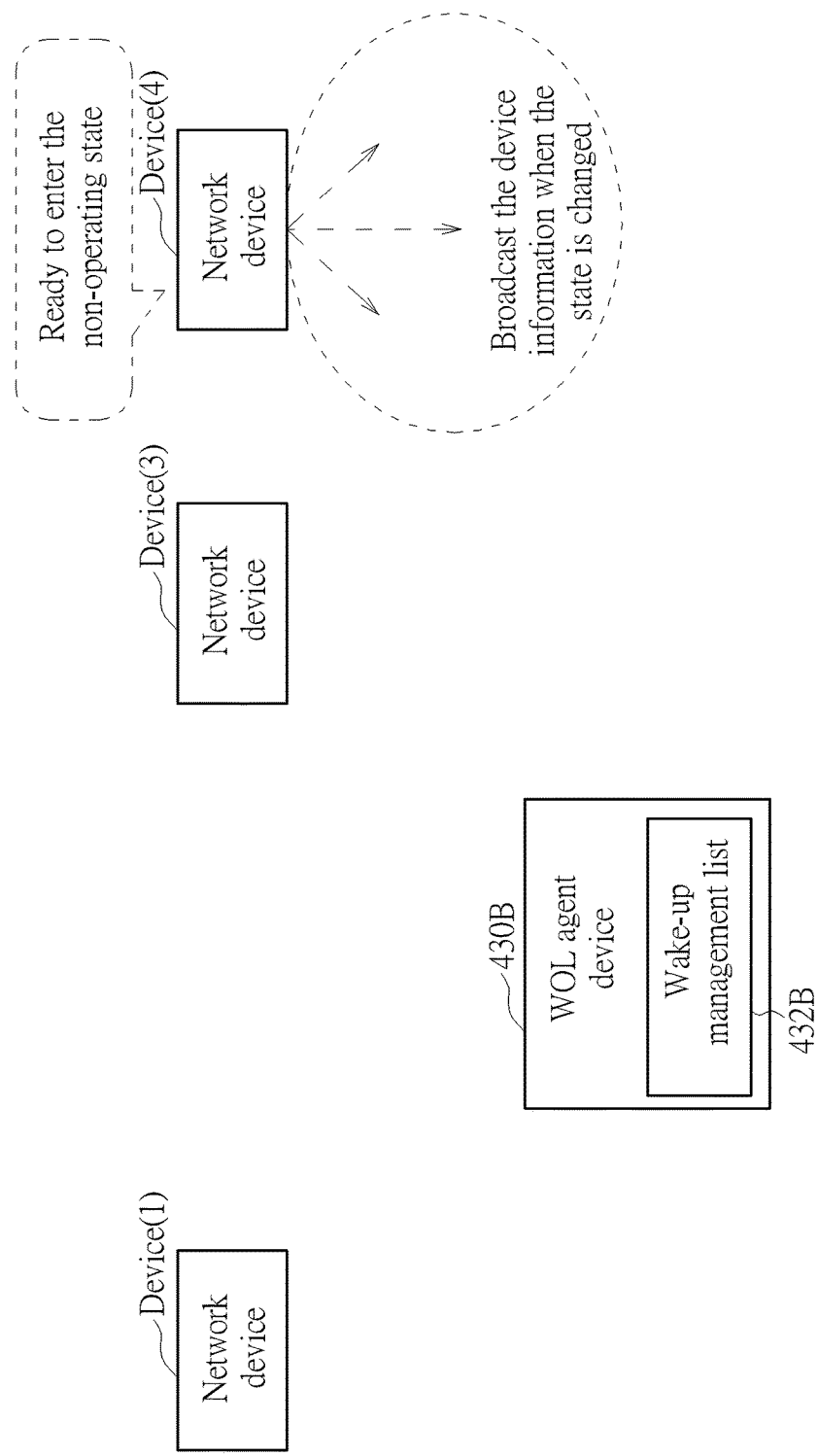
FIG. 8 is a broadcast operation in the wake-up management architecture shown in FIG. 6.

FIG. 8 is a broadcast operation in the wake-up management architecture shown in FIG. 6. In this embodiment, the WOL agent device 430B may perform the aforementioned operations of the WOL agent device 230. Some features in this embodiment similar to those in the above embodiments/ modifications are omitted here for brevity.

Figure 9:
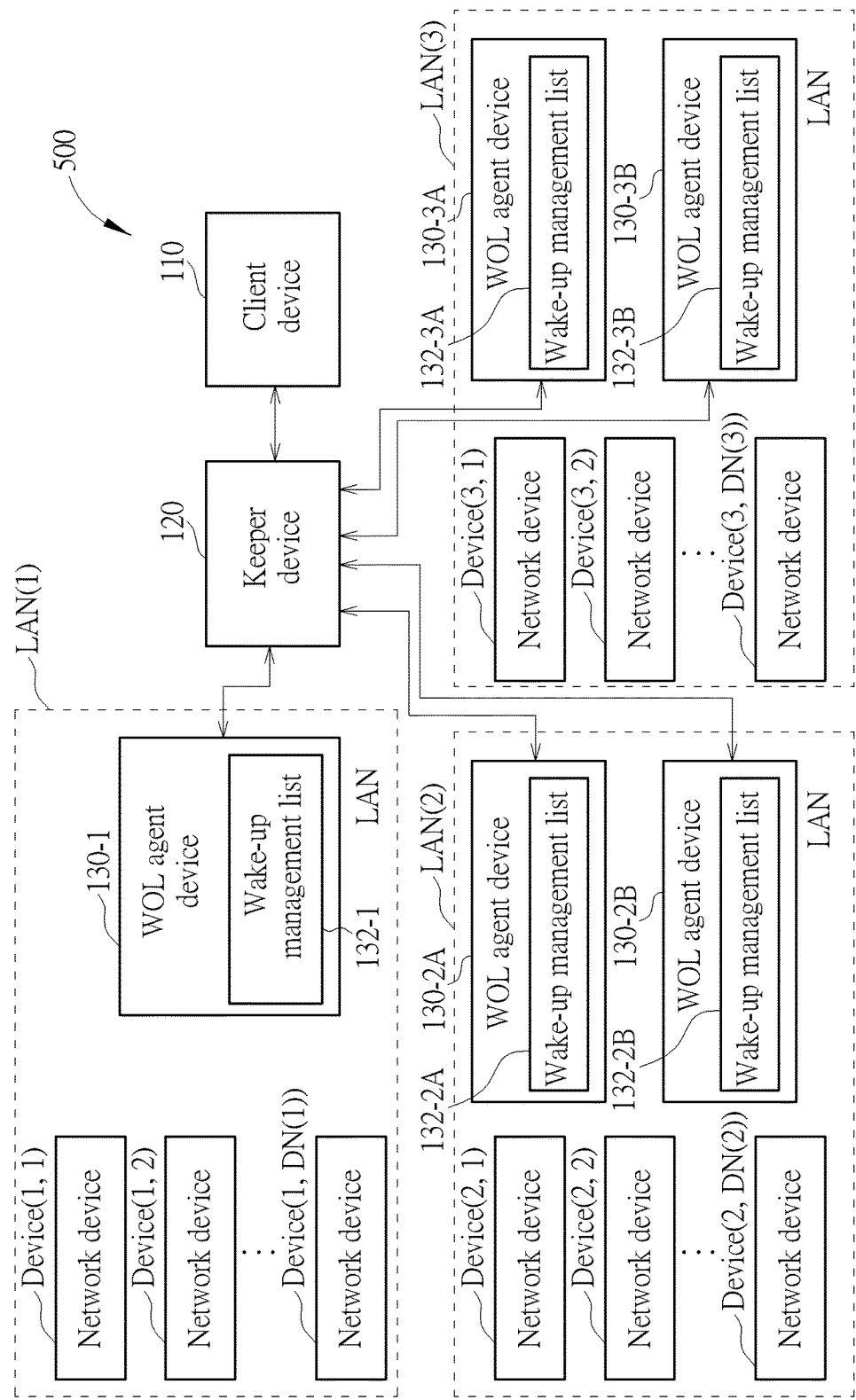
FIG. 9 is a diagram illustrating a network system according to another embodiment of the present invention.

FIG. 9 is a diagram illustrating a network system 500 according to another embodiment of the present invention. For better understanding, the LANs {LAN(1), LAN(2), LAN(3)} in FIG. 9 may be an example of the aforementioned LN LANs {LAN(1), . . . , LAN(LN), and the three sets of network devices {{Device(1, 1), Device(1, 2), . . . , Device(1, DN(1))}, {Device(2, 1), Device(2, 2), . . . , Device(2, DN(2))}, {Device(3, 1), Device(3, 2), . . . , Device(3, DN(3))}} shown in FIG. 9 may be an example of the aforementioned LN sets of network devices {{Device(1, 1), Device(1, 2), . . . , Device(1, DN(1))}, . . . , {Device(LN, 1), Device(LN, 2), . . . , Device(LN, DN(LN))}}. The WOL agent device of some LANs may be implemented as a fault tolerance architecture, wherein LN=3. According to some embodiments, the number of the aforementioned LN LANs {LAN(1), . . . , LAN(LN) (or the number of the aforementioned LN sets of network devices) may be modified.

In this embodiment, each of the WOL agent devices 130-1, 130-2A, 130-2B, 130-3A and 130-3B may create a communications channel leading to the keeper device 120, and the WOL agent devices 130-1, 130-2A, 130-2B, 130-3A and 130-3B may manage the wake-up management lists 132-1, 132-2A, 132-2B, 132-3A and 132-3B, respectively. Further, the WOL agent devices 130-2A and 130-2B may forma single WOL agent fault tolerance architecture. For example, one WOL agent device of the WOL agent devices 130-2A and 130-2B may operate in a default manner, and the other WOL agent device of the WOL agent devices 130-2A and 130-2B may be the backup device of the WOL agent device. In addition, the WOL agent devices 130-3A and 130-3B may form a multiple WOL agent fault tolerance architecture. For example, the WOL agent devices 130-3A and 130-3B may simultaneously operate, and may be each other's backup device. According to some embodiments, the aforementioned fault tolerance architecture (e.g. a single WOL agent fault tolerance architecture or the multiple WOL agent fault tolerance architecture) may be modified.

According to some embodiments, before any WOL agent device of the network system 500 enters the non-operating state (e.g. the sleep or power off state), the WOL agent device may inform other network devices or WOL agent devices of its current state by broadcasting. Hence, the fault tolerance architecture of the WOL agent device in the LAN may refer to its fault tolerance method to perform fault tolerance processes, in order to maintain the wake-up management operation.

According to some embodiments, the keeper device 120 may automatically manage the WOL information in the network system 500, to allow the user to easily use any LAN in the network system 500, without the need for manual settings. When the network device in any LAN of the network system 500 changes its state, one or more WOL agent devices in the LAN may communicate with the keeper device 120 via corresponding communications channels. Further, the keeper device 120 may record various states of each LAN in the network system 500, such as the state indicating which devices are managed by which WOL agent device. The keeper device 120 may manage multiple LANs such as those shown in FIG. 9, wherein the number of WOL agent devices in each LAN is not limited. Referring to the scheme shown in FIG. 9, the keeper device 120 may record respective management information of the three LANs {LAN(1), LAN(2), LAN(3)}, and the user may operate or access devices in any LAN and WOL agent device through the keeper device 120.

The method and associated apparatus of the present invention may solve problems existing in the related art without introducing unwanted side effects. Further, the method and associated apparatus of the present invention may raise the overall efficiency. For example, the network devices and the WOL agent devices do not need to be preset, nor do they need to learn of each other's existence in advance. In another example, any of the network devices and the WOL agent devices may be dynamically added into a LAN. In another example, the client device 110 may easily manage or access network devices of any of the LANs through the keeper device 120. In addition, the method and associated apparatus of the present invention is compatible with fault tolerance architecture. When a specific WOL agent device stops providing services, or enters the power off state, the fault tolerance architecture positioned in the same LAN may automatically solve this problem, wherein the fault tolerance architecture may be implemented as a failover architecture having multiple WOL agent devices, or a failback architecture having a single WOL agent device. For example, when adopting the failover architecture, with the aid of the automatic managing architecture of the keeper device 120, the client device 110 does not need to communicate with each WOL agent device. In another example, when the failback architecture is adopted, with the aid of the automatic managing architecture of the keeper device 120, problems such as a missing WOL agent device can be prevented. Hence, the wake-up management architecture based on the method and associated apparatus of the present invention can improve the use experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing wake-up management, the method being applied to at least one portion of a network system, the network system comprising a local area network (LAN), the method comprising:
  utilizing a wake-on-LAN (WOL) agent device to receive device information of a network device, wherein the WOL agent device and the network device are positioned in the LAN, and the network device broadcasts the device information of the network device according to a predetermined communications protocol;
  utilizing the WOL agent device to refer to the device information of the network device to update a wake-up management list in the WOL agent device, wherein the wake-up management list comprises the device information of the network device; and
  utilizing the WOL agent device to perform a WOL operation regarding the network device according to the wake-up management list;
  wherein the network system comprises a plurality of network devices, wherein the network devices are positioned in the LAN, and the network device is one of the network devices; and the method further comprises:
  before the WOL agent device enters a non-operating state, utilizing the WOL agent device to broadcast device information of the WOL agent device in order to inform at least one other device in the LAN of the non-operating state of the WOL agent device;
  wherein another of the network devices is selected as another WOL agent device in the LAN according to a predetermined rule; and other WOL agent device is a backup device of the WOL agent device.

2. The method of claim 1, wherein the network device refers to the predetermined communications protocol to perform at least one broadcast operation, to allow the WOL agent device to determine a state transition of the network device; and the method further comprises:
  in response to the broadcast operation, utilizing the WOL agent device to determine the state transition of the network device to automatically perform a WOL configuration regarding the network device.

3. The method of claim 2, wherein before the network device enters the non-operating state, the network device refers to the predetermined communications protocol to broadcast the device information of the network device in order to inform the WOL agent device of the non-operating state of the network device; and when the non-operating state of the network device is informed, the WOL agent device records the non-operating state of the network device in the wake-up management list.

4. The method of claim 3, wherein when the network device enters an operating state from the non-operating state, the network device refers to the predetermined communications protocol to broadcast the device information of the network device, in order to inform the WOL agent device of the operating state of the network device; and after the operating state of the network device is informed, the WOL agent device records the operating state of the network device in the wake-up management list.

5. The method of claim 1, wherein the device information of the network device comprises at least one of a media access control (MAC) address of the network device, an Internet protocol (IP) address of the network device, and a unique identifier (UID) of the network device.

6. The method of claim 5, wherein the device information of the network device further comprises a latest state of the network device.

7. The method of claim 1, further comprising:
utilizing the WOL agent device to send the device information of the network device to a keeper device, wherein the device information of the network device comprises at least one state of the network device; and
when the keeper device receives a request from a client device, utilizing the keeper device to refer to the state of the network device to decide whether to assign a WOL task to the WOL agent device, wherein the client device is positioned external to the LAN, and the WOL task comprises waking up the network device;
wherein the client device sends the request to the keeper device, in order to access the network device through the keeper device.

8. The method of claim 7, wherein the network system comprises another LAN, and the another WOL agent device in the network system is positioned in the other LAN; and the method further comprises:
utilizing the other WOL agent device to send device information of another network device to the keeper device, wherein the device information of the other network device comprises at least one state of the other network device; and
when the keeper device receives another request from the client device, utilizing the keeper device to refer to the state of the other network device to decide whether to assign another WOL task to the other WOL agent device, wherein the other WOL task comprises waking up the other network device;
wherein the client device sends the other request to the keeper device, in order to access the other network device through the keeper device.

9. The method of claim 1, wherein the WOL agent device sends the wake-up management list to the other WOL agent device, to allow the other WOL agent device to utilize the wake-up management list.

10. An apparatus for performing wake-up management, the apparatus comprising at least one portion of a network system, the network system comprising a local area network (LAN), the apparatus comprising:
a wake-on-LAN (WOL) agent device, positioned in the LAN, the WOL agent device arranged to perform wake-up control, wherein the WOL agent device receives device information of a network device, the network device is positioned in the LAN, and the network device refers to a predetermined communications protocol to broadcast the device information of the network device;
wherein the WOL agent device refers to the device information of the network device to update a wake-up management list in the WOL agent device, wherein the wake-up management list comprises the device information of the network device; and the WOL agent device refers to the wake-up management list to perform a WOL operation regarding the network device;
wherein the network system comprises a plurality of network devices, wherein the network devices are positioned in the LAN, and the network device is one of the network devices; before the WOL agent device enters a non-operating state, the WOL agent device broadcasts device information of the WOL agent device in order to inform at least one other device in the LAN of the non-operating state of the WOL agent device; another of the network devices is selected as another WOL agent device in the LAN according to a predetermined rule; and other WOL agent device is a backup device of the WOL agent device.

11. The apparatus of claim 10, wherein the network device refers to the predetermined communications protocol to perform at least one broadcast operation, to allow the WOL agent device to determine a state transition of the network device; and the WOL agent device determines the state transition of the network device in response to the broadcast operation, to automatically perform WOL configuration regarding the network device.

12. The apparatus of claim 11, wherein before the network device enters the non-operating state, the network device refers to the predetermined communications protocol to broadcast the device information of the network device, in order to inform the WOL agent device of the non-operating state of the network device; and when the non-operating state of the network device is informed, the WOL agent device records the non-operating state of the network device in the wake-up management list.

13. The apparatus of claim 12, wherein when the network device enters an operating state from the non-operating state, the network device refers to the predetermined communications protocol to broadcast the device information of the network device, in order to inform the WOL agent device of the operating state of the network device; and after the operating state of the network device is informed, the WOL agent device records the operating state of the network device in the wake-up management list.

14. The apparatus of claim 10, wherein the device information of the network device comprises at least one of a media access control (MAC) address of the network device, an Internet protocol (IP) address of the network device, and a unique identifier (UID) of the network device.

15. The apparatus of claim 14, wherein the device information of the network device further comprises a latest state of the network device.

16. The apparatus of claim 10, wherein the WOL agent device sends the device information of the network device to a keeper device, wherein the device information of the network device comprises at least one state of the network device; when the keeper device receives a request from a client device, the keeper device refers to the state of the network device to decide whether to assign a WOL task to the WOL agent device, wherein the client device is positioned external to the LAN, and the WOL task comprises waking up the network device; and the client device sends the request to the keeper device, in order to access the network device through the keeper device.

17. The apparatus of claim 16, wherein the network system comprises another LAN, and the another WOL agent device in the network system is positioned in the other LAN; the other WOL agent device sends device information of another network device to the keeper device, wherein the device information of the other network device comprises at least one state of the other network device; when the keeper device receives another request from the client device, the keeper device refers to the state of the other network device to decide whether to assign another WOL task to the other WOL agent device, wherein the other WOL task comprises waking-up the other network device; and the client device sends the other request to the keeper device in order to access the other network device through the keeper device.

18. The apparatus of claim 10, wherein the WOL agent device sends the wake-up management list to the other WOL agent device, to allow the other WOL agent device to utilize the wake-up management list.

* * * * *